(12) United States Patent
Geldenbott et al.

(10) Patent No.: US 9,413,889 B2
(45) Date of Patent: Aug. 9, 2016

(54) HOUSE NUMBER NORMALIZATION FOR MASTER STREET ADDRESS GUIDE (MSAG) ADDRESS MATCHING

(75) Inventors: Gerhard Geldenbott, Seattle, WA (US); Gordon John Hines, Seattle, WA (US); Jeffrey Thomas Martin, Seattle, WA (US); Abe Backus, Shelton, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 618 days.

(21) Appl. No.: 12/232,484

(22) Filed: Sep. 18, 2008

(65) Prior Publication Data

US 2009/0092232 A1    Apr. 9, 2009

Related U.S. Application Data

(60) Provisional application No. 60/960,459, filed on Oct. 1, 2007, provisional application No. 60/960,148, filed on Sep. 18, 2007.

(51) Int. Cl.
*H04M 11/04* (2006.01)
*H04B 7/00* (2006.01)
(Continued)

(52) U.S. Cl.
CPC .............. *H04M 3/5116* (2013.01); *H04L 67/18* (2013.01); *H04W 4/02* (2013.01); *H04M 2242/04* (2013.01); *H04M 2242/30* (2013.01); *H04W 4/22* (2013.01); *H04W 76/007* (2013.01)

(58) Field of Classification Search
CPC . H04M 3/5116; H04M 76/007; G08B 25/003
USPC ........ 707/692; 379/45; 455/404.1, 404.2, 521
See application file for complete search history.

(56) References Cited

U.S. PATENT DOCUMENTS 1,103,073 A    7/1914   O'Connel
4,445,118 A    4/1984   Taylor
(Continued)

FOREIGN PATENT DOCUMENTS

WO    WO01/45342     6/2001
WO    WO2004/025941  3/2004
WO    WO2005/051033  6/2005

OTHER PUBLICATIONS

Intrado MSAG Prep for E9-1-1 Program and Documentation. Intrado Inc., Longmont, CO. Sep. 14, 2006. Accessed: Nov. 8, 2011. Idaho PSAP Standards Committee. Idaho Emergency Communications Commission, <http://idahodispatch.com/index.php?option=com_docman&task=doc_download&gid=3&Itemid=73>.*

(Continued)

*Primary Examiner* — Duc Nguyen
*Assistant Examiner* — Kile Blair
(74) *Attorney, Agent, or Firm* — Tarolli, Sundheim, Covell & Tummino LLP (57) ABSTRACT

A technique and apparatus to allow a determination of an MSAG-valid address by use of normalized house numbers included in address entries in an MSAG Address data store, to facilitate the simple match of an input civic/postal address against entries in a MSAG data store based on the use of a normalization of the house numbers. The house number normalization allows for an easy lexicographical determination as to whether or not the input civic/postal house number falls with the range of house numbers in the MSAG data store. The inventive process and apparatus pre-stores normalized house number fields in an MSAG address data store, and then normalizes house numbers in a civic/postal address associated with an emergency call. The normalized numbers in the input civic/postal address associated with the emergency call are then lexicographically matched with normalized entries in an MSAG address data store.

5 Claims, 5 Drawing Sheets

| MSAG ADDRESS ID | MSAG ADDRESS | MSAG_LOW_HO USE_NUMBER_NORM | MSAG_HIGH_HO USE_NUMBER_NORM |
|---|---|---|---|
| 1 | 1100-2200 27th AVE NE SEATTLE WA 98115 | 0000001100 | 0000002200 |
| 2 | N0340-N0900 NE 65th ST SEATTLE WA 98115 | N0000000340 | N0000000900 |
| 3 | 10G-40G NF PARK RD SEATTLE WA 98115 | 000000010G | 000000040G |

300

302, 304, 306

(51) Int. Cl.
*H04M 3/51* (2006.01)
*H04W 4/02* (2009.01)
*H04L 29/08* (2006.01)
*H04W 4/22* (2009.01)
*H04W 76/00* (2009.01)

(56) References Cited

U.S. PATENT DOCUMENTS

| | | | |
|---|---|---|---|
| 4,868,570 A * | 9/1989 | Davis | 341/106 |
| 4,891,638 A | 1/1990 | Davis | |
| 4,891,650 A | 1/1990 | Scheffer | |
| 4,952,928 A | 8/1990 | Carroll | |
| 4,972,484 A | 11/1990 | Theile | |
| 5,014,206 A | 5/1991 | Scribner | |
| 5,043,736 A | 8/1991 | Darnell | |
| 5,055,851 A | 10/1991 | Sheffer | |
| 5,068,656 A | 11/1991 | Sutherland | |
| 6,032,051 A | 2/2000 | Hall | |
| 6,067,045 A | 5/2000 | Castelloe | |
| 6,108,533 A | 8/2000 | Brohoff | |
| 6,134,316 A | 10/2000 | Kallioniemi | |
| 6,181,939 B1 | 1/2001 | Ahvenainen | |
| 6,253,074 B1 | 6/2001 | Carlsson | |
| 6,278,701 B1 | 8/2001 | Ayyagari | |
| 6,321,092 B1 | 11/2001 | Fitch | |
| 6,360,102 B1 | 3/2002 | Havinis | |
| 6,397,208 B1 | 5/2002 | Lee | |
| 6,427,001 B1 | 7/2002 | Contractor | |
| 6,526,026 B1 | 2/2003 | Menon | |
| 6,529,500 B1 | 3/2003 | Pandharipande | |
| 6,564,261 B1 | 5/2003 | Gudjonsson | |
| 6,580,390 B1 | 6/2003 | Hay | |
| 6,587,691 B1 | 7/2003 | Granstam | |
| 6,600,927 B2 | 7/2003 | Hamilton | |
| 6,621,810 B1 | 9/2003 | Leung | |
| 6,687,504 B1 | 2/2004 | Raith | |
| 6,694,351 B1 | 2/2004 | Shaffer | |
| 6,731,940 B1 | 5/2004 | Nagendran | |
| 6,744,858 B1 | 6/2004 | Ryan | |
| 6,775,534 B2 | 8/2004 | Lindgren | |
| 6,795,444 B1 | 9/2004 | Vo | |
| 6,813,264 B2 | 11/2004 | Vassilovski | |
| 6,839,417 B2 | 1/2005 | Weisman | |
| 6,847,618 B2 | 1/2005 | Laursen | |
| 6,876,734 B1 | 4/2005 | Summers | |
| 6,898,633 B1 | 5/2005 | Lyndersay | |
| 6,940,826 B1 | 9/2005 | Simard | |
| 6,940,950 B2 | 9/2005 | Dickinson et al. | |
| 6,957,068 B2 | 10/2005 | Hutchison | |
| 6,968,044 B2 | 11/2005 | Beason | |
| 6,985,747 B2 | 1/2006 | Chithambaram | |
| 7,072,667 B2 | 7/2006 | Olrik | |
| 7,106,717 B2 | 9/2006 | Rousseau | |
| 7,110,773 B1 | 9/2006 | Wallace | |
| 7,113,128 B1 | 9/2006 | Pitt | |
| 7,136,466 B1 | 11/2006 | Gao | |
| 7,174,153 B2 | 2/2007 | Ehlers | |
| 7,177,397 B2 | 2/2007 | McCalmont | |
| 7,177,398 B2 | 2/2007 | Meer | |
| 7,177,399 B2 | 2/2007 | Dawson | |
| 7,200,380 B2 | 4/2007 | Havlark | |
| 7,245,900 B1 | 7/2007 | Lamb | |
| 7,246,187 B1 | 7/2007 | Ezra | |
| 7,260,186 B2 | 8/2007 | Zhu | |
| 7,260,384 B2 | 8/2007 | Bales et al. | |
| 7,269,428 B1 | 9/2007 | Wallenius | |
| 7,302,582 B2 * | 11/2007 | Snapp et al. | 713/185 |
| 7,321,773 B2 | 1/2008 | Hines | |
| 7,330,899 B2 | 2/2008 | Wong | |
| 7,333,480 B1 | 2/2008 | Clarke | |
| 7,369,508 B2 | 5/2008 | Parantainen | |
| 7,369,530 B2 | 5/2008 | Keagy | |
| 7,382,773 B2 | 6/2008 | Schoeneberger | |
| 7,392,240 B2 * | 6/2008 | Scriffignano et al. | 707/999.003 |
| 7,394,896 B2 | 7/2008 | Norton | |
| 7,403,939 B1 | 7/2008 | Virdy | |
| 7,424,293 B2 | 9/2008 | Zhu | |
| 7,426,380 B2 | 9/2008 | Hines | |
| 7,428,571 B2 | 9/2008 | Ichimura | |
| 7,436,785 B1 | 10/2008 | McMullen | |
| 7,440,442 B2 | 10/2008 | Grabelsky et al. | |
| 7,450,951 B2 | 11/2008 | Vimpari | |
| 7,453,990 B2 | 11/2008 | Welenson | |
| 7,495,608 B1 | 2/2009 | Chen | |
| 7,573,982 B2 | 8/2009 | Breen | |
| 7,623,447 B1 | 11/2009 | Faccin | |
| 7,711,094 B1 | 5/2010 | Olshansky | |
| 7,747,258 B2 | 6/2010 | Farmer | |
| 7,764,961 B2 | 7/2010 | Zhu | |
| 7,783,297 B2 | 8/2010 | Ishii | |
| 7,787,611 B1 | 8/2010 | Kotelly | |
| 7,792,989 B2 | 9/2010 | Toebes | |
| 7,881,233 B2 | 2/2011 | Bieselin | |
| 7,890,122 B2 | 2/2011 | Walsh | |
| 7,937,067 B2 | 5/2011 | Maier | |
| 8,005,683 B2 | 8/2011 | Tessel | |
| 8,027,658 B2 | 9/2011 | Suryanarayana | |
| 8,060,389 B2 | 11/2011 | Johnson | |
| 8,308,570 B2 | 11/2012 | Fiedler | |
| 2001/0040886 A1 | 11/2001 | Jimenez | |
| 2002/0077083 A1 | 6/2002 | Zellner | |
| 2002/0077084 A1 | 6/2002 | Zellner | |
| 2002/0077118 A1 | 6/2002 | Zellner | |
| 2002/0077897 A1 | 6/2002 | Zellner | |
| 2002/0085538 A1 | 7/2002 | Leung | |
| 2002/0086676 A1 | 7/2002 | Hendrey | |
| 2002/0102996 A1 | 8/2002 | Jenkins | |
| 2002/0118650 A1 | 8/2002 | Jagadeesan et al. | |
| 2002/0123327 A1 | 9/2002 | Vataja | |
| 2002/0126656 A1 | 9/2002 | Park | |
| 2002/0158777 A1 | 10/2002 | Flick | |
| 2002/0173317 A1 | 11/2002 | Nykanen | |
| 2003/0009277 A1 | 1/2003 | Fan | |
| 2003/0012148 A1 | 1/2003 | Peters | |
| 2003/0026245 A1 | 2/2003 | Ejzak | |
| 2003/0044654 A1 | 3/2003 | Holt | |
| 2003/0086539 A1 | 5/2003 | McCalmont | |
| 2003/0108176 A1 | 6/2003 | Kung | |
| 2003/0109245 A1 | 6/2003 | McCalmont | |
| 2003/0118160 A1 | 6/2003 | Holt | |
| 2003/0119521 A1 | 6/2003 | Tipnis | |
| 2003/0119528 A1 | 6/2003 | Pew | |
| 2003/0186709 A1 | 10/2003 | Rhodes | |
| 2004/0043775 A1 | 3/2004 | Kennedy | |
| 2004/0047461 A1 | 3/2004 | Weisman | |
| 2004/0076277 A1 | 4/2004 | Kuusinen | |
| 2004/0143852 A1 | 7/2004 | Meyers | |
| 2004/0181689 A1 | 9/2004 | Kiyoto | |
| 2004/0184584 A1 | 9/2004 | McCalmont | |
| 2004/0190497 A1 | 9/2004 | Knox | |
| 2004/0198386 A1 | 10/2004 | Dupray | |
| 2004/0267445 A1 | 12/2004 | De Luca | |
| 2005/0020242 A1 | 1/2005 | Holland | |
| 2005/0043037 A1 | 2/2005 | Ioppe | |
| 2005/0053209 A1 | 3/2005 | D'Evelyn | |
| 2005/0063519 A1 | 3/2005 | James | |
| 2005/0074107 A1 | 4/2005 | Renner | |
| 2005/0078612 A1 | 4/2005 | Lang | |
| 2005/0083911 A1 | 4/2005 | Grabelsky | |
| 2005/0101335 A1 | 5/2005 | Kelly | |
| 2005/0107673 A1 | 5/2005 | Ball | |
| 2005/0119012 A1 | 6/2005 | Merheb | |
| 2005/0125376 A1 | 6/2005 | Curtis | |
| 2005/0135569 A1 | 6/2005 | Dickinson | |
| 2005/0136885 A1 | 6/2005 | Kaltsukis | |
| 2005/0169248 A1 | 8/2005 | Truesdale | |
| 2005/0192822 A1 | 9/2005 | Hartenstein | |
| 2005/0201529 A1 | 9/2005 | Nelson | |
| 2005/0213716 A1 | 9/2005 | Zhu | |
| 2005/0238156 A1 | 10/2005 | Turner | |
| 2005/0255857 A1 | 11/2005 | Kim | |
| 2005/0265318 A1 | 12/2005 | Khartabil | |
| 2005/0282518 A1 | 12/2005 | D'Evelyn | |
| 2005/0287979 A1 | 12/2005 | Rollender | |

(56) References Cited

U.S. PATENT DOCUMENTS

| | | |
|---|---|---|
| 2005/0289097 A1 | 12/2005 | Trossen |
| 2006/0008065 A1 | 1/2006 | Longman |
| 2006/0010200 A1 | 1/2006 | Mousseau |
| 2006/0026288 A1 | 2/2006 | Acharya |
| 2006/0068753 A1 | 3/2006 | Karpen |
| 2006/0077911 A1 | 4/2006 | Shaffer |
| 2006/0079330 A1 | 4/2006 | Dvorak |
| 2006/0088152 A1 | 4/2006 | Green |
| 2006/0104306 A1 | 5/2006 | Adamczyk |
| 2006/0120517 A1 | 6/2006 | Moon |
| 2006/0128395 A1 | 6/2006 | Muhonen |
| 2006/0135177 A1 | 6/2006 | Winterbottom |
| 2006/0154710 A1 | 7/2006 | Serafat |
| 2006/0188083 A1 | 8/2006 | Breen |
| 2006/0193447 A1 | 8/2006 | Schwartz |
| 2006/0239205 A1 | 10/2006 | Warren |
| 2006/0250987 A1 | 11/2006 | White |
| 2006/0258380 A1 | 11/2006 | Liebowitz |
| 2006/0281437 A1 | 12/2006 | Cook |
| 2006/0293024 A1 | 12/2006 | Benco |
| 2006/0293066 A1 | 12/2006 | Edge |
| 2007/0003024 A1 | 1/2007 | Olivier |
| 2007/0019614 A1 | 1/2007 | Hoffmann |
| 2007/0022011 A1 | 1/2007 | Altberg |
| 2007/0026871 A1 | 2/2007 | Wager |
| 2007/0027997 A1 | 2/2007 | Polk |
| 2007/0041513 A1 | 2/2007 | Gende |
| 2007/0041516 A1 | 2/2007 | Dickinson |
| 2007/0042765 A1 | 2/2007 | Bailin |
| 2007/0049288 A1 | 3/2007 | Lamprecht |
| 2007/0060097 A1 | 3/2007 | Edge |
| 2007/0115941 A1 | 5/2007 | Patel |
| 2007/0121601 A1 | 5/2007 | Kikinis |
| 2007/0149213 A1 | 6/2007 | Lamba |
| 2007/0160036 A1 | 7/2007 | Smith |
| 2007/0162228 A1 | 7/2007 | Mitchell |
| 2007/0201623 A1 | 8/2007 | Hines |
| 2007/0206568 A1 | 9/2007 | Silver |
| 2007/0206613 A1 | 9/2007 | Silver |
| 2007/0242660 A1 | 10/2007 | Xu |
| 2007/0263610 A1 | 11/2007 | Mitchell |
| 2007/0270164 A1 | 11/2007 | Maier |
| 2008/0032703 A1 | 2/2008 | Krumm |
| 2008/0037715 A1 | 2/2008 | Prozeniuk |
| 2008/0059304 A1 | 3/2008 | Kimsey |
| 2008/0063153 A1 | 3/2008 | Krivorot |
| 2008/0065775 A1 | 3/2008 | Polk |
| 2008/0080691 A1 | 4/2008 | Dolan |
| 2008/0146343 A1 | 6/2008 | Sullivan et al. |
| 2008/0186164 A1 | 8/2008 | Emigh |
| 2008/0214202 A1 | 9/2008 | Toomey |
| 2008/0249967 A1 | 10/2008 | Flinn |
| 2009/0323636 A1 | 12/2009 | Dillon |
| 2010/0029244 A1 | 2/2010 | Moodbidri |
| 2010/0069034 A1 | 3/2010 | Dickinson |
| 2010/0119049 A1 | 5/2010 | Clark |
| 2010/0178973 A1 | 7/2010 | Snoddy et al. |
| 2010/0218664 A1 | 9/2010 | Toledano et al. |
| 2010/0328093 A1 | 12/2010 | Robinson et al. |
| 2011/0113060 A1 | 5/2011 | Martini |
| 2011/0149953 A1 | 6/2011 | Helgeson et al. |
| 2011/0273568 A1 | 11/2011 | Lagassey |
| 2012/0001750 A1 | 1/2012 | Monroe |
| 2012/0189107 A1 | 7/2012 | Dickinson |
| 2013/0072308 A1 | 3/2013 | Peck et al. |
| 2013/0079152 A1 | 3/2013 | Hall |

OTHER PUBLICATIONS

B.W. Parkinson et al., Global Positioning System: Theory and Applications, vol. 1, Progress in Astronautics and Aeronautics, vol. 163, American Institute of Aeronautics and Astronautics, Inc., p. 184-187, 1996.

Le-Pond Chin, Jyh-Hong Wen, Ting-Way Liu, The Study of the Interconnection of GSM Mobile Communication System Over IP based Network, May 6, 2001, IEEE. Vehicular Technology Conference, vol. 3, pp. 2219-2223.

Yilin Zhao Efficient and reliable date transmission for cellular and GPS based mayday systems, Nov. 1997, IEEE, IEEE Conference on Intelligent Transportation System, 1997. ITSC 97, 555-559.

Extended European Search Report from EPO in European Appl. No. 06827172.5 dated Dec. 29, 2009.

Location Based Services V2 Roaming Support (non proprietary), 80-V8470-2NP A, dated Jan. 27, 2005, pp. 1-56.

International Search Report received in PCT/US11/01971 dated Feb. 28, 2013.

International Search Report received in PCT/US2011/001990 dated Apr. 24, 2012.

International Search Report received in PCT/US2012/000422 dated Dec. 10, 2012.

* cited by examiner

|   | INPUT HOUSE NUM LOW | INPUT HOUSE NUM HIGH | NORMALIZED HOUSE NUM LOW | NORMALIZED HOUSE NUM HIGH |
|---|---|---|---|---|
| 202 → | 1100 | 2200 | 0000001100 | 0000002200 |
| 204 → | N0340 | N0900 | N000000340 | N000000900 |
| 206 → | 10G | 40G | 000000010G | 000000040G |

HOUSE NUMBER NORMALIZATION FOR MASTER STREET ADDRESS GUIDE (MSAG) ADDRESS MATCHING

This application claims priority from U.S. Provisional Application No. 60/960,459, entitled "MSAG Simple Matching a Civic/Postal Address Using Unique Normalized House Number Fields", to Geldenbott, Hines and Martin, filed Oct. 1, 2007; and also from U.S. Provisional Application No. 60/960,148, entitled "Optimal Selection of MSAG Address for Valid Civic/Postal Address", to Geldenbott, filed Sep. 18, 2007, the entirety of both of which are expressly incorporated herein by reference.

BACKGROUND OF THE INVENTION

1. Field of the Invention

This invention relates generally to long distance carriers, Internet Service Providers (ISPs), and information content delivery services/providers and long distance carriers. More particularly, it relates to emergency call systems (e.g., E9-1-1) including wireless and Internet Protocol (IP) based Voice Over Internet Protocol (VoIP) emergency call systems.

2. Background of Related Art 9-1-1 is a phone number widely recognized in North America as an emergency phone number that is used to contact emergency dispatch personnel. Enhanced 9-1-1 (E9-1-1) is defined by an emergency call being selectively routed to an appropriate PSAP, and enhanced information (callback number, name and location) is provided to the PSAP. This is accomplished through the use of the ANI. The ANI may be the real phone number of the caller (in landline E911) or a pseudo-ANI called an ESRK (in cellular E911) or ESQK (in VoIP E911). Regardless of the network type, a 9-1-1 service becomes E-9-1-1 when automatic number identification and automatic location information related to the call is provided to the 9-1-1 operator at the PSAP.

This identifier allows the PSAP to retrieve location information such as the Master Street Address Guide (MSAG) valid address of the E9-1-1 caller's Civic/Postal Address. The Master Street Address Guide (MSAG) represents a community provided local address master guide that permits the most accurate dispatch of emergency personnel to a "correct address." The "correct address" originates as the civic/postal address of an E9-1-1 emergency caller over a wireless and/or Internet Protocol (IP) based Voice Over Internet Protocol (VoIP) emergency call system. The civic/postal address represents the caller's location at the time when the emergency call is placed. This civic/postal address needs to be associated with an appropriate corresponding MSAG address, which in most cases is required by the public safety answering point (PSAP).

A Public Service Answering Point (PSAP) is a dispatch office that receives 9-1-1 calls from the public. A PSAP may be a local, fire or police department, an ambulance service or a regional office covering all services. As used herein, the term "PSAP" refers to either a public safety access point (PSAP), or to an Emergency Call Center (ECC), a VoIP term.

Distributed emergency call systems in telecommunications are in general very complex computing systems. Emergency calls that originate from a VoIP network use well proven routing paradigms already used for cellular 911 calls, or for traditional landline 911 calls. These paradigms usually work well, because VoIP customers can usually be grouped into two categories: a mobile VoIP caller that resembles a cellular user, and a stationary VoIP user resembling landline usage.

Traditional landline systems use pre-provisioned, generally static subscriber addresses, where the landline automatic location identification (ALI) provisioning process insures a match to a master street address guide (MSAG) record, which contains an emergency service number (ESN) used to route emergency calls to a PSAP.

But determination of the location of a mobile device proves much, much more challenging. To determine location of a mobile device, some conventional cellular systems use separate triangulation technologies (or any of a number of other techniques) to find a latitude & longitude of an emergency caller. These systems then use a geographic information system (GIS) system to query for a pre-defined region (e.g., a PSAP polygon) that contains this location.

Of course, errors may occur in conventional systems when determining the location of a mobile user. But even though it's very possible that these queried PSAP polygons can lead to a different (i.e., wrong) neighboring PSAP than an equivalent address provisioned in a landline ALI, this discrepancy is conventionally accepted by PSAPs because the location itself is likely to be imprecise due to measurement errors—sometimes the location is off by hundreds of feet.

Conventional VoIP systems use proprietary technologies, usually based on GIS polygons, or based on pre-provisioning of the caller in the traditional landline ALI long before the need for an emergency call.

Thus, traditional landline paradigms provide the most accurate location for its static users, but require the caller's address to be pre-provisioned into a landline automatic location identifier (ALI). This pre-provisioning (often referred to as service order interface (SOI) loading) usually takes a few days between the caller notifying their service provider of their address change, and this change being reflected in the landline ALI. But during this window a 911 call might be made, and if so it would be routed using the "old" data still in the landline ALI. Even the fastest possible conventional landline ALI provisioning takes at least several hours.

Existing solutions include the NENA VoIP architecture for enhanced 9-1-1 services standard NENA 08-001. However, such conventional technologies are too complicated and not always practical. Moreover, conventional systems are disadvantageous because they are unable to handle the embedded geographic location to precisely route the caller to the correct PSAP using the "just-in-time" paradigm.

A "simple match" to find an MSAG-valid address refers to a simple lexicographic comparison of an input civic/postal address against the entries in an MSAG address store to find a positive match. The present inventors have appreciated that house numbers prove to be particularly hard to compare as in many cases house numbers contain digits and alpha-numeric characters in any random order. Given this fact, two house numbers that are not character-for-character identical may refer to the same house number as determined by a human observer.

Compounding this issue is the fact that otherwise conventional MSAG data stored in an otherwise conventional MSAG address data store is always given as range data including a low and high house number, e.g., "100-2000 Elm Street." So with this, a simple match must successfully determine if a given input civic/postal house number falls within a stored MSAG address house number range.

The MSAG-valid address is required by most PSAPs, as it represents a community provided local address that allows accurate dispatch of emergency personnel to the correct address. But a challenge remains to provide a MSAG-valid address, particularly with respect to a real-time Voice Over Internet Protocol (VoIP) emergency call.

SUMMARY OF THE INVENTION

In accordance with the principles of the present invention, a master street address guide (MSAG) address data store comprises a plurality of address entries, each entry comprising an address, a normalized low house number field, and a normalized high house number field.

In accordance with another aspect of the invention, a method of matching a civic/postal address associated with an emergency call with a master street address guide (MSAG) address table comprises normalizing the house number of an input civic/postal address associated with an emergency call to comprise an alphanumeric string having a fixed number of characters. The normalized house number is provided for matching against normalized entries in the master street address guide (MSAG). A MSAG address is selected from the MSAG address table in which the normalized house number falls lexicographically between the normalized low house number and the normalized high house number of the MSAG address.

In yet other aspects of the invention, a process of normalizing a house number portion of a civic/postal address and MSAG address range for use with an address database. Normalizing consists of converting each non-alphanumeric character in the house number portion to a space character. Consecutive space characters in the house number portion are replaced with a single space character. Leading and trailing spaces in the house number portion are removed. Each group of consecutive digits are located and padded with leading characters such that each digits group is of a fixed common length.

Normalization of the house number does not convert a house number to a valid house number, rather it converts house numbers to a standardized form for the purpose of lexicographical comparison.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a technique and apparatus to allow a determination of an MSAG-valid address by use of normalized house numbers included in address entries in an MSAG Address data store. In particular, it provides a unique method to facilitate the simple match of an input civic/postal address against entries in a MSAG data store based on the use of a normalization of the house numbers. The house number normalization allows for a simple lexicographic determination as to whether or not the input civic/postal house number falls with the range of house numbers in the MSAG data store.

The present invention provides a very high matching rate of a master street address guide (MSAG) address using unique house number normalization on both: (1) an input civic/postal address; and (2) the MSAG addresses stored in an MSAG address data store. The inventive process and apparatus normalizes house number fields in an MSAG address data store in advance of matching, and then normalizes input house numbers from a civic/postal address associated with an emergency call. The normalized numbers in the input civic/postal address associated with the emergency call are then lexicographically matched with normalized entries in an MSAG address data store to successfully perform simple MSAG matching on an input civic/postal address.

An otherwise conventional MSAG address data store contains address ranges. According to the invention, the low and high MSAG house numbers are normalized and stored based on house number normalization rules established by the present invention. The normalized house numbers stored in the MSAG address data store may be normalized before first being stored in the MSAG address data store, or may be converted and restored in a new format accommodating the normalized form of the house numbers.

According to the invention, an input civic/postal address house number associated with an emergency call is converted using the same house number normalization as that used on the entries already stored in the MSAG address data store, and then lexicographically matched against the address range in the MSAG address data store. The conversion may be accomplished in a module associated with presenting a match inquiry to the MSAG address data store, or within the mobile device making the relevant emergency call, or anywhere there between. In this way, because of the normalization of the input house number, the input civic/postal address has a high probability to successfully match against the MSAG address data store, in accordance with the principles of the present invention.

With this invention, normalized house numbers are used on both the input civic/postal house number, as well as on the MSAG address low and high house numbers in the MSAG data store. The normalized civic/postal input house number is then lexicographically compared against the normalized MSAG address low and high house numbers in the data store.

While the disclosed embodiments utilize an MSAG address matching technique referred to as a Simple Match for which an MSAG Address table suffices, in practice the MSAG data store may contain more than just the MSAG address table suitable to support the relevant match technique used.

Figure 1:
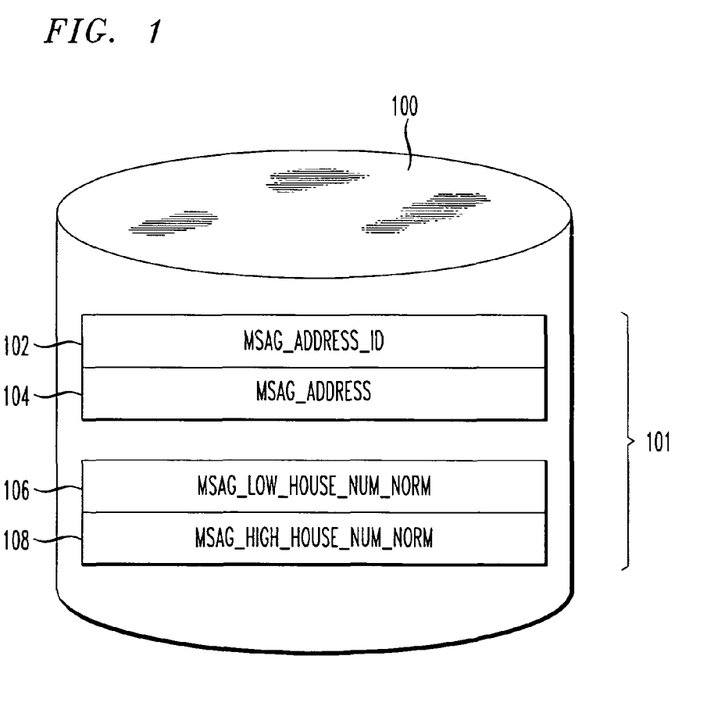
FIG. 1 shows an exemplary MSAG data store including an MSAG address table including a plurality of entries, in accordance with the principles of the present invention.

FIG. 1 shows an exemplary MSAG data store 100 including an MSAG address table 101 including a plurality of entries, in accordance with the principles of the present invention.

In particular, as shown in FIG. 1, a suitable database, referred to herein as an MSAG data store 100, includes an MSAG Address table 101. The MSAG Address table 101 includes multiple entries, each of which includes an associated data field for each of an MSAGAddress_ID 102, an MSAG Address 104, an MSAG_LOW_HOUSE_NUM_NORM 106, and an MSAG_HIGH_HOUSE_NUM_NORM 108.

Thus, each entry in the MSAG Address table 101 is uniquely identified by the MSAGAdress_ID 102 data.

Though the MSAG Address 104 field is shown in the disclosed embodiments as one field for reasons of simplicity, the MSAG Address 104 field in general preferably comprises several fields capable of documenting a street address.

According to the invention, each entry in the MSAG Address table 101 also comprises a NORMALIZED low house number MSAG_LOW_HOUSE_NUM_NORM 106, and a NORMALIZED high house number MSAG_HIGH_HOUSE_NUM_NORM 108.

Figure 2:
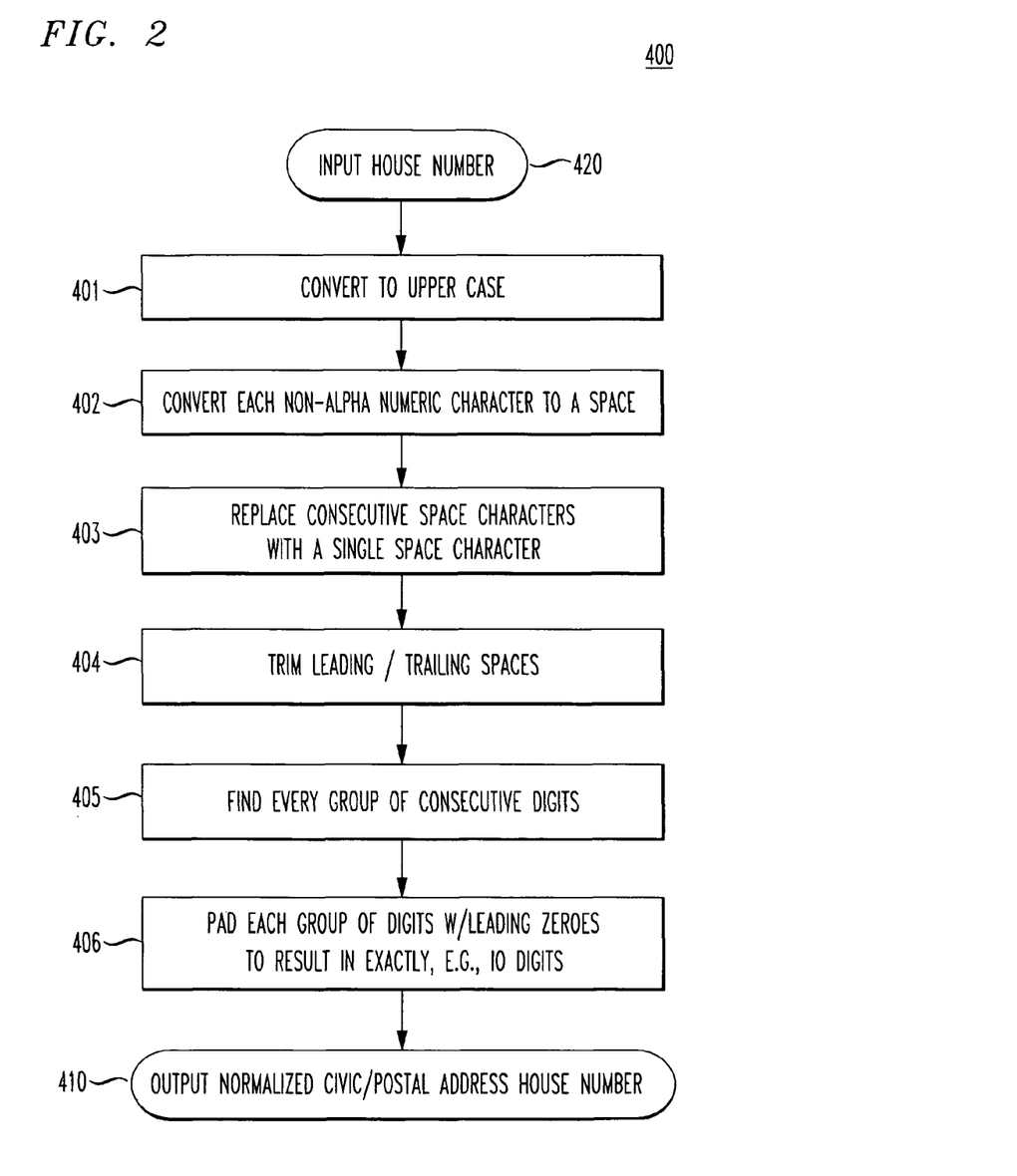
FIG. 2 shows an exemplary process of normalizing house numbers from a civic/postal address and from MSAG addresses for use with respect to an MSAG Address data store, in accordance with the principles of the present invention.

FIG. 2 shows an exemplary process of normalizing house numbers extracted from a civic/postal address, and for use of normalizing MSAG Address data store house numbers, in accordance with the principles of the present invention.

In particular, FIG. 2 shows exemplary rules 400 to normalize a house number.

In step 420, a house number is input.

In step 401, the input house number is converted to a common case, e.g., all to upper case. Of course, normalization might instead normalize all house numbers to lower case within the scope of the present invention.

In step 402, each non-alphanumeric character (e.g. punctuation) is converted to a space character.

In step 403, consecutive space characters are replaced with a single space character.

In step 404, leading spaces and trailing spaces are removed.

In step 405, every group of consecutive digits (not whitespace, not alphanumeric) are located.

In step 406, each located group of digits is padded with leading zeros such that each digits group is exactly a common length, e.g., a preferred 10 digits in the disclosed embodiments.

Figure 3:
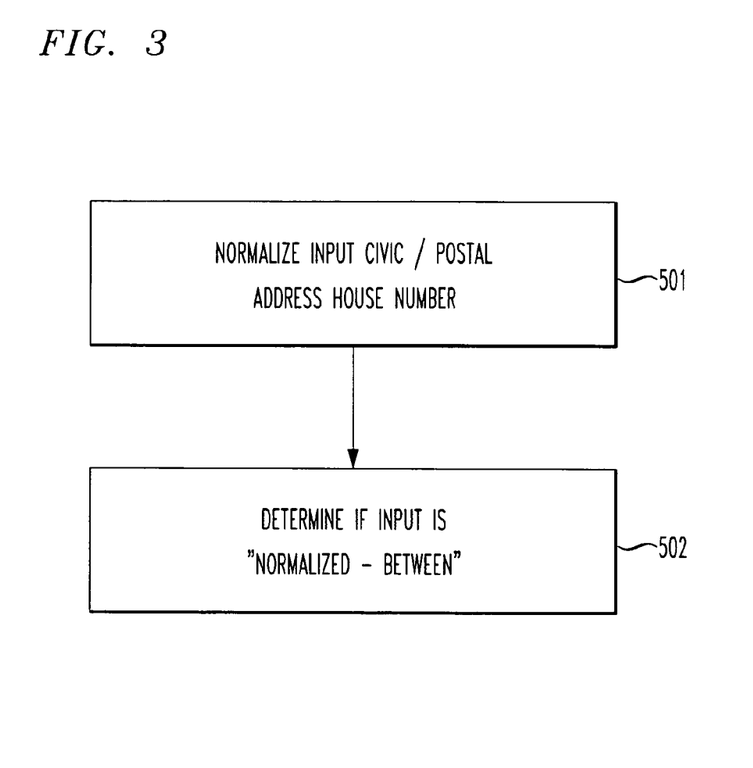
FIG. 3 shows normalizing an input house number, then determined if the input house number is "normalized-between" a given entry's low house number and a high house number, in accordance with the principles of the present invention.

FIG. 3 shows normalizing an input civic/postal house number, then determined if the input house number is "normalized-between" a given entry's low house number and a high house number, in accordance with the principles of the present invention.

In particular, as shown in FIG. 3, in step 501 an input civic/postal address house number is normalized using the rules shown in FIG. 2.

In step 502, the input civic/postal address including the now-normalized house number is compared to entries in the relevant MSAG Address data store to search for MSAG addresses where the input house number is "normalized-between" those MSAG address records. If the normalized input house number is lexicographically between the normalized low and normalized high house numbers of an MSAG address record, then the input house number is referred to as "normalized-between" the low and high house numbers of that MSAG record. Even though the original non-normalized input civic/postal house number might not be lexicographically between the original non-normalized high and low house number on that MSAG record, this 'normalized-between' step finds legitimate MSAG records that match the input civic/postal house number.

Figure 4:
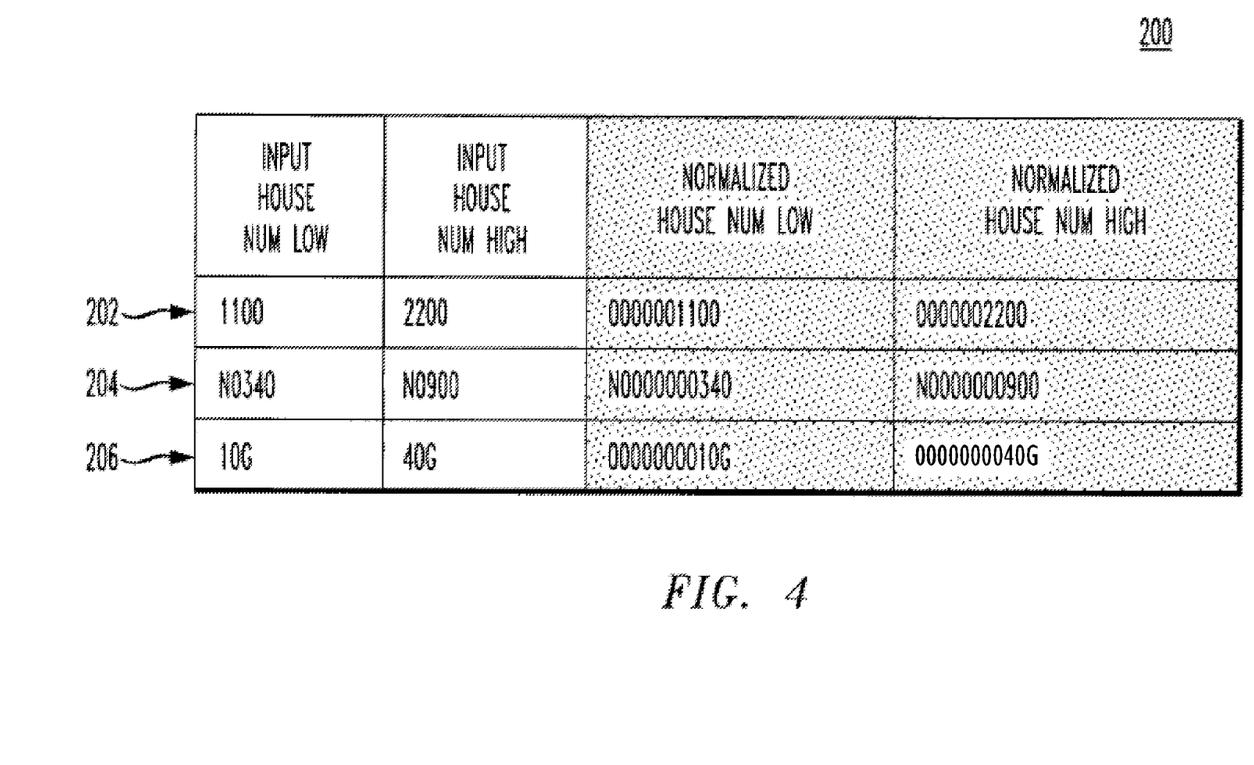
FIG. 4 shows sample house number normalizations, in accordance with the principles of the present invention.
Figure 5:
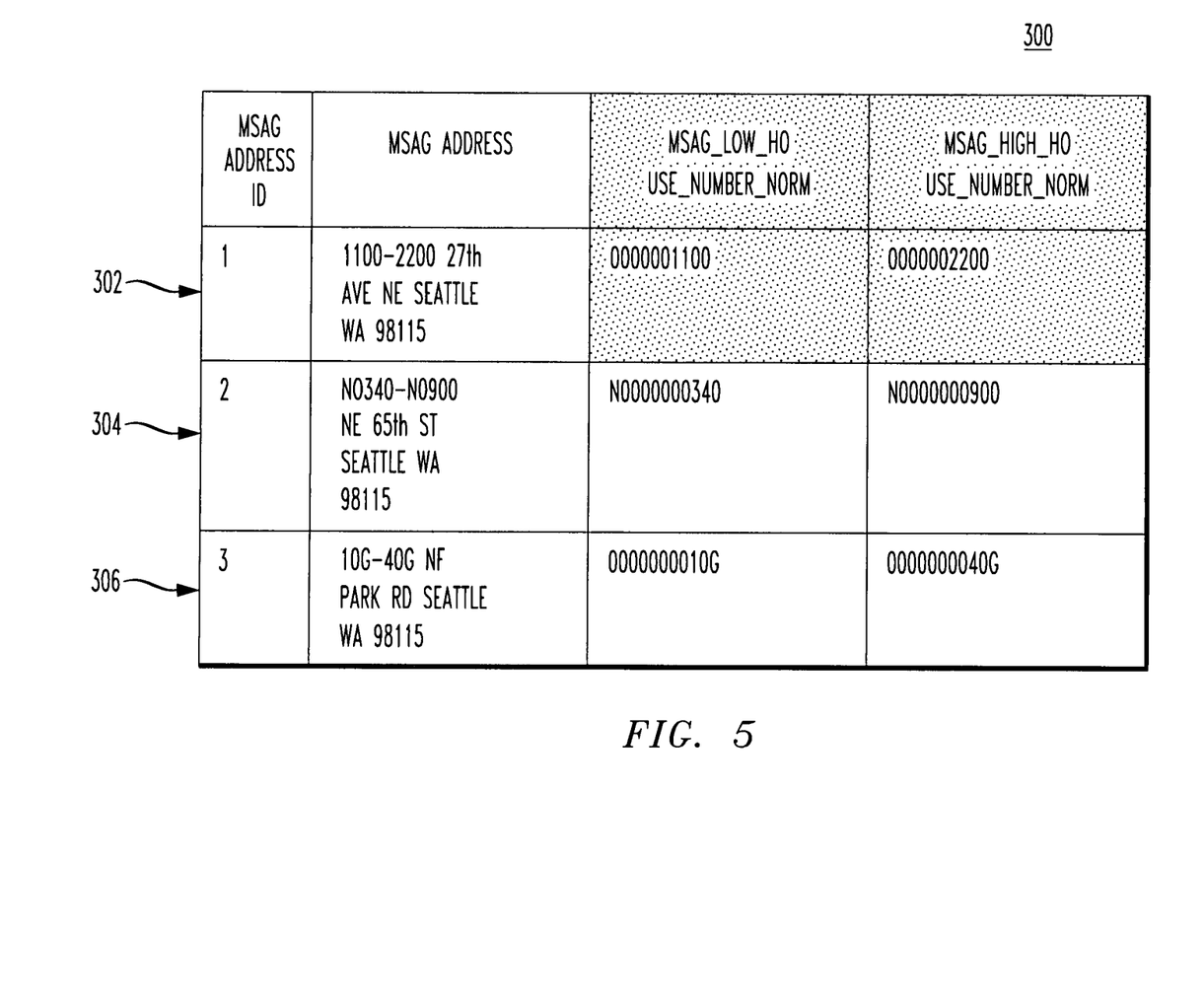
FIG. 5 shows sample normalized house numbers inserted into respective entries of an exemplary MSAG address table in an MSAG Address data store, in accordance with the principles of the present invention.

FIG. 4 and FIG. 5 illustrate the normalization process and determining whether or not a house number is "normalized-between" a low and high house number. First, FIG. 4 showing sample house number normalizations 200 will be described in accordance with the principles of the present invention.

In particular, as shown in FIG. 4, the input low and high house numbers are normalized preferably before being stored in the MSAG Address table. The first example 202 in FIG. 4 shows how house numbers consisting only of digits are normalized using the rules enumerated above. In this example, the civic/postal low and high (i.e., range) house numbers "1100" and "2200" are normalized into "0000001100" and "0000002200", respectively.

Similarly, the second example 204 shows house numbers starting with an alpha-numeric character (e.g., "N"). In the second example 204, the civic/postal low and high house numbers "N0340" and "N0900" are normalized into "N0000000340" and "N0000000900", respectively.

The third example 206 depicts an example of normalization of house numbers with a trailing alpha-numeric character. In this example, original civic/postal low and high house numbers "10G" and "40G" are normalized into "0000000010G" and "0000000040G", respectively.

More complex examples would work in the same fashion following the enumerated rules above, in accordance with the principles of the present invention.

FIG. 5 shows sample normalized house numbers inserted into respective entries of an exemplary MSAG address table 300 in an MSAG Address data store, in accordance with the principles of the present invention.

In particular, as shown in FIG. 5, the MSAG address table 300 includes sample civic/postal addresses and house number ranges (i.e., as defined by both low and high house numbers), as shown in the examples 202, 204 and 206 in FIG. 4.

It is important to point out that the "MSAG Address" parameter shown in FIG. 5 still contains the original UN-normalized house number, whereas the parameters or fields described as "MSAG_LOW_HOUSE_NUMBER_NORM" and "MSAG_HIGH_HOUSE_NUMBER_NORM" contain the corresponding normalized values. With that, the normalized house numbers for the "MSAG Address" field in the first civic/postal address entry 302 is "1100-2200 27$^{th}$ AVE NE Seattle Wash. 98115", with the address range defined by the normalized values of "0000001100" and "0000002200", respectively.

Similarly, the "MSAG Address" field in the second civic/postal address entry 304 contains the original civic/postal address: "N0340-N0900 NE 65$^{th}$ St Seattle Wash. 98115", from which the normalized address is determined and stored as a low and high house number, e.g., "N0000000340" and "N0000000900".

Finally, in the third and last example civic/postal address entry 306, the "MSAG Address" field contains the original the original civic/postal address: "10G-40G NE Park Rd Seattle Wash. 98115", from which the normalized address is determined and stored as a low and high house number, e.g., "0000000010G" and "0000000040G".

Therefore, taking the very last example, for the sample civic/postal input address of "0035G NE Park Rd Seattle Wash. 98115" a simple match would be found with civic/postal address 306, in accordance with the principles of the present invention, since the normalized form of "0035G" is "0000000035G", which lexicographically falls between the normalized range of "0000000010G" and "0000000040G" of that civic/postal address entry 306.

Accordingly, using modules put in place to normalize not only the house number range in all entries put into an MSAG Address table, but also a suitable normalization module to perform the same normalization on an input civic/postal address to be matched to the entries in the MSAG Address table, the present invention guarantees that a given civic/postal address with a non-trivial house number can be simply matched against an MSAG address in a MSAG Address data store.

The present invention has particular applicability with location based server vendors.

While the invention has been described with reference to the exemplary embodiments thereof, those skilled in the art will be able to make various modifications to the described embodiments of the invention without departing from the true spirit and scope of the invention.

What is claimed is:

1. A method of directing an emergency call to an emergency terminal responsible for a civic/postal address received with the emergency call, comprising:
    obtaining a plurality of USPS standard format civic/postal address ranges for build into a physical MSAG database;
    converting an upper limit and a lower limit to each of said plurality of USPS standard format civic/postal address ranges to a non-USPS standard format;
    storing said non-USPS standard format civic/postal address ranges into said physical MSAG database;
    receiving an emergency call from a mobile device together with an associated USPS standard format civic/postal address;
    converting said associated USPS standard format civic/postal address into said non-UPSP standard format, wherein said non-UPSP standard format comprises:
        converting each non-alphanumeric character in a street number portion of said USPS standard format civic/postal address to instead comprise a space character,
        replacing consecutive space characters in said street number portion of said USPS standard format civic/postal address with a single space character,
        removing a leading space and a trailing space in said street number portion of said USPS standard format civic/postal address, and
        padding each group of consecutive digits in said USPS standard format civic/postal address with at least one leading character such that a resultant street number portion of said non-USPS standard format civic/postal address is of a fixed common length;
    lexicographically matching said converted, non-USPS standard format civic/postal address to a non-USPS standard format address range entry pre-stored in said physical MSAG database; and
    directing said emergency call from said mobile device to a proper physical public safety answering point (PSAP) terminal responsible for said USPS standard format civic/postal address based on said lexicographically matched, converted, non USPS standard format civic/postal address.

2. The method of directing an emergency call to an emergency terminal responsible for a civic/postal address received with the emergency call according to claim 1, wherein:
    said fixed common length is 10 characters.

3. The method of directing an emergency call to an emergency terminal responsible for a civic/postal address received with the emergency call according to claim 1, wherein said at least one leading character comprises:
    a zero character.

4. The method of directing an emergency call to an emergency terminal responsible for a civic/postal address received with the emergency call according to claim 1, wherein said converting said associated USPS standard format civic/postal address further comprises:
    converting said street number portion of said USPS standard format civic/postal address to upper case characters.

5. The method of directing an emergency call to an emergency terminal responsible for a civic/postal address received with the emergency call according to claim 1, wherein:
    said non-alphanumeric character in said street number portion of said USPS standard format civic/postal address is a punctuation character.

* * * * *